United States Patent
Procida

(10) Patent No.: US 9,772,053 B2
(45) Date of Patent: Sep. 26, 2017

(54) UNBONDED FLEXIBLE PIPE

(71) Applicant: National Oilwell Varco Denmark I/S, Brondby (DK)

(72) Inventor: Inger-Margrete Procida, Hellerup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 330 days.

(21) Appl. No.: 14/423,768

(22) PCT Filed: Aug. 15, 2013

(86) PCT No.: PCT/DK2013/050267
§ 371 (c)(1),
(2) Date: Feb. 25, 2015

(87) PCT Pub. No.: WO2014/032674
PCT Pub. Date: Mar. 6, 2014

(65) Prior Publication Data
US 2015/0240971 A1 Aug. 27, 2015

(30) Foreign Application Priority Data

Sep. 3, 2012 (DK) .................. 2012 70533

(51) Int. Cl.
*F16L 11/16* (2006.01)
*F16L 11/08* (2006.01)
(Continued)

(52) U.S. Cl.
CPC ............... *F16L 11/08* (2013.01); *B32B 1/08* (2013.01); *B32B 5/024* (2013.01); *B32B 15/082* (2013.01);
(Continued)

(58) Field of Classification Search
CPC ........ F16L 11/16; F16L 11/082; F16L 11/083; F16L 59/153
(Continued)

(56) References Cited

U.S. PATENT DOCUMENTS 3,102,044 A  8/1963  Joseph
3,311,133 A  3/1967  Kinander
(Continued)

FOREIGN PATENT DOCUMENTS

GB  1 404 394  8/1975
WO  00/70256 A1  11/2000
(Continued)

OTHER PUBLICATIONS

Extended European Search Report for 13 83 3082 dated Feb. 25, 2016.
(Continued)

*Primary Examiner* — Patrick F Brinson
(74) *Attorney, Agent, or Firm* — Pearne & Gordon LLP

(57) ABSTRACT

The invention relates to an unbonded flexible pipe with a longitudinal axis and which comprises from inside outwards a carcass formed by metal windings with gaps between neighboring windings, at least one covering tape and an inner sealing sheath of a polymer extruded onto the covering tape. The covering tape is helically wound with a winding direction defining a tape length direction and a tape width direction perpendicular to the tape length direction. The covering tape comprises lengthwise continuous filament yarns arranged in the tape length direction of the covering tape. The covering tape has a thickness direction perpendicular to the tape length direction. The warp yarns have a thickness determined in the thickness direction of the covering tape of about 100 μm or less, such as of about 50 μm or less, such as from about 5 to about 25 μm.

22 Claims, 2 Drawing Sheets

(51) Int. Cl.
*B32B 5/02* (2006.01)
*B32B 15/082* (2006.01)
*B32B 15/085* (2006.01)
*B32B 15/14* (2006.01)
*B32B 1/08* (2006.01)
B29C 47/00 (2006.01)
B29C 47/02 (2006.01)

(52) U.S. Cl.
CPC ............ *B32B 15/085* (2013.01); *B32B 15/14* (2013.01); *F16L 11/088* (2013.01); *B29C 47/0023* (2013.01); *B29C 47/021* (2013.01); *B32B 2260/021* (2013.01); *B32B 2260/046* (2013.01); *B32B 2262/0269* (2013.01); *B32B 2262/0276* (2013.01); *B32B 2262/0292* (2013.01); *B32B 2262/101* (2013.01); *B32B 2262/106* (2013.01); *B32B 2307/54* (2013.01); *B32B 2597/00* (2013.01)

(58) Field of Classification Search
USPC ........................................ 138/134, 135, 127
See application file for complete search history.

(56) References Cited

U.S. PATENT DOCUMENTS

| | | |
|---|---|---|
| 3,687,169 A | 8/1972 | Reynard |
| 3,858,616 A | 1/1975 | Thiery |
| 4,402,346 A | 9/1983 | Cheetham |
| 4,549,581 A | 10/1985 | Unno |
| 4,706,713 A | 11/1987 | Sadamitsu |
| 5,213,637 A | 5/1993 | Mallen Herrero |
| 5,407,744 A | 4/1995 | Mallen Herrero |
| 5,601,893 A | 2/1997 | Strassel |
| 5,645,109 A | 7/1997 | Herrero |
| 5,669,420 A | 9/1997 | Herrero |
| 5,730,188 A | 3/1998 | Kalman |
| 5,813,439 A | 9/1998 | Herrero |
| 5,837,083 A | 11/1998 | Booth |
| 5,922,149 A | 7/1999 | Mallen Herrero |
| 6,016,847 A | 1/2000 | Jung |
| 6,065,501 A | 5/2000 | Feret |
| 6,123,114 A | 9/2000 | Seguin |
| 6,145,546 A | 11/2000 | Hardy |
| 6,192,941 B1 | 2/2001 | Mallen-Herrero |
| 6,253,793 B1 | 7/2001 | Dupoiron |
| 6,283,161 B1 | 9/2001 | Feret |
| 6,291,079 B1 | 9/2001 | Mallen Herrero |
| 6,354,333 B1 | 3/2002 | Dupoiron |
| 6,382,681 B1 | 5/2002 | Berton |
| 6,390,141 B1 | 5/2002 | Fisher |
| 6,408,891 B1 | 6/2002 | Jung |
| 6,415,825 B1 | 7/2002 | Dupoiron |
| 6,454,887 B1 | 9/2002 | Yamato |
| 6,454,897 B1 | 9/2002 | Morand |
| 6,516,833 B1 | 2/2003 | Witz |
| 6,668,867 B2 | 12/2003 | Espinasse |
| 6,691,743 B2 | 2/2004 | Espinasse |
| 6,739,355 B2 | 5/2004 | Glejbol |
| 6,840,286 B2 | 1/2005 | Espinasse |
| 6,843,278 B2 * | 1/2005 | Espinasse ............... F16L 11/16 138/127 |
| 6,843,279 B1 | 1/2005 | Ungemah |
| 6,889,717 B2 | 5/2005 | Coutarel |
| 6,889,718 B2 | 5/2005 | Glejbol |
| 6,904,939 B2 | 6/2005 | Jung |
| 6,978,806 B2 | 12/2005 | Glejbol |
| 6,981,526 B2 | 1/2006 | Glejbol |
| 7,024,941 B2 | 4/2006 | Andersen |
| 7,032,623 B2 | 4/2006 | Averbuch |
| 7,069,955 B2 * | 7/2006 | Glejbol ................ F16L 59/153 138/134 |
| 7,238,400 B2 * | 7/2007 | Gerez .................. F16L 11/082 138/129 |
| 7,311,123 B2 | 12/2007 | Espinasse |
| 7,445,030 B2 * | 11/2008 | Hardy .................. F16L 11/083 138/129 |
| 7,487,803 B2 | 2/2009 | Lokere |
| 9,482,373 B2 * | 11/2016 | Glejbol ................. F16L 11/082 |
| 2004/0060610 A1 * | 4/2004 | Espinasse ............... F16L 11/16 138/134 |
| 2008/0190507 A1 * | 8/2008 | Hardy ...................... B32B 1/08 138/134 |
| 2010/0326558 A1 | 12/2010 | Do |

FOREIGN PATENT DOCUMENTS

| | | |
|---|---|---|
| WO | 02/095281 A1 | 11/2002 |
| WO | 03/044414 A1 | 5/2003 |
| WO | 2008/025893 A1 | 3/2008 |
| WO | 2008/077409 A1 | 7/2008 |
| WO | 2008/077410 A1 | 7/2008 |
| WO | 2008/119676 A1 | 10/2008 |
| WO | 2009/024156 A2 | 2/2009 |
| WO | 2009/106078 A1 | 9/2009 |
| WO | 2011/042023 A1 | 4/2011 |
| WO | 2011/072690 | 6/2011 |
| WO | 2011/079845 A1 | 7/2011 |
| WO | 2012/062328 A1 | 5/2012 |

OTHER PUBLICATIONS

"Recommended Practice for Flexible Pipe" ANSI/API Recommended Practice 17B, Fourth Edition, Jul. 2008.
"Specificiation for Unbonded Flexible Pipe" ANSI/API Specification 17J, Third Edition, Jul. 2008.
Search Report issued in Application No. PA 2012 70533 dated Mar. 11, 2013.
International Search Report issued in Application No. PCT/DK2013/050267 dated Nov. 19, 2013.
Written Opinion issued in Application No. PCT/DK2013/050267 dated Nov. 19, 2013.

* cited by examiner

UNBONDED FLEXIBLE PIPE

TECHNICAL FIELD

The present invention concerns an unbonded flexible pipe suitable for subsea transportation of fluids, such as water, CO2, petrochemical products and/or drilling fluids.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an inner liner also often called an inner sealing sheath or an inner sheath, which forms a barrier against the outflow of the fluid which is conveyed in the bore of the pipe, and one or more armoring layers. In general flexible pipes are expected to have a lifetime of 20 years in operation. Examples of unbonded flexible pipes are e.g. disclosed in U.S. Pat. No. 6,454,887, U.S. Pat. No. 6,415,825, U.S. Pat. No. 6,123,114 and U.S. Pat. No. 5,601,893.

The term "unbonded" means in this text that at least two of the layers including the armoring layers and polymer layers are not bonded to each other. In practice the known pipe normally comprises at least two armoring layers which are not bonded to each other, neither directly nor indirectly via another layer.

The inner sealing sheath is the innermost sealing sheath of the pipe.

For many applications a pipe of the above type will need to fulfill a number of requirements. First of all the pipe should have a high mechanical strength to withstand the enormous forces it will be subjected to during transportation, deployment and operation. The internal pressure (from inside of the pipe and outwards) and the external pressure (from outside of the pipe) are usually very high and may vary considerably along the length of the pipeline, particularly when applied at varying water depths. For many applications, and in particular for use at water depths where it will be subjected to very high external pressure it is required that the unbonded flexible pipe comprises an internal armor layer arranged inside the inner sealing sheath to prevent collapse of the pipe. Such internal armor layer is usually referred to as a carcass and is usually in the form of helically wound and interlocked wires.

However, due to the heat of the fluid often transported in such pipes there have been problems since the influence of the carcass to the inner sealing sheath when subjected to increased pressure and heat has shown to be very damaging. When a notch was formed in the inner sealing sheath, crack propagation from the notch resulted in weakening of the inner sealing sheath and ultimately the inner sealing sheath would leak.

An attempt to solve this problem has been provided in U.S. Pat. No. 4,706,713, by winding a protective sheath around the carcass prior to extrusion of the inner sealing sheath thereon.

In U.S. Pat. No. 6,843,279 it is suggested to wind a tape with a winding angle of less than 35 degrees between the carcass and the inner sealing sheath.

The application of a protective sheath between the carcass and the inner sealing sheath as described in the above prior art document has shown to alleviate risk of damaging the inner sealing sheath due to notch sensitivity for some applications. However, for applications where the unbonded flexible pipe will be subjected to very high external pressure and/or where the fluid transported is very hot, the problems of inner sealing sheath damage still need to be solved.

DISCLOSURE OF INVENTION

An object of the present invention is to provide an unbonded flexible pipe suitable for transporting fluids at relatively high temperature and at relatively deep water, where the risk of damage of the inner sealing sheath due to notch sensitivity of the inner sealing sheath is reduced compared to prior art solutions.

These and other objects have been solved by the invention as defined in the claims and as described herein below.

It has been found that the invention and embodiments thereof have a number of additional advantages which will be clear to the skilled person from the following description.

According to the invention it has surprisingly been found that by winding a covering tape between the carcass and the inner sealing sheath, where the covering tape comprises thin continuous filament yarns (referred to as warp yarns) arranged in the tape length direction of the covering tape, the covering tape provides a high notch resistance pipe. It is believed that this effect is due to the winding in the length direction of the covering tape which inherently results in a pulling effect in the length direction combined with that the covering tape comprises thin continuous filament yarns arranged in same direction. The damaging notches found in prior art pipes with tape between carcass and inner sealing sheath have been found to be located mainly along edges of the tape. By providing the unbonded flexible pipe with a tape between the carcass and the inner sealing sheath according to the present invention formation of notches located along edges of the tape has found to be significantly decreased.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "substantially" should herein be taken to mean that ordinary product variances and tolerances are comprised.

The terms "inside" and "outside" a layer of the pipe is used to designate the relative distance to the axis of the pipe, such that inside a layer means the area encircled by the layer, i.e. with a shorter axial distance than the layer, and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The term "innermost layer" means the layer closest to the centre axis of the pipe seen in radial direction, and accordingly the "outermost layer" means the layer farthest from the centre axis of the pipe seen in radial direction.

The term "winding direction" means winding direction relatively to the longitudinal axis of the unbonded flexible pipe unless otherwise specified.

Filaments are continuously single fiber (also called monofilament).

The phrase "continuous" as used herein in connection with fibers, filaments, strands or rovings means that the fibers, filaments, strands, yarns or rovings means that they generally have a significant length but should not be understood to mean that the length is perpetual or infinite. Continuous fibers, such as continuous filaments, strands, yarns or rovings preferably have a length of at least about 10 m, preferably at least about 100 m, more preferably at least about 1000 m.

The term "strand" is used to designate an untwisted bundle of filaments.

The term "yarn" is used to designate a twisted bundle of filaments and/or cut fibers. Yarn includes threads and ropes. The yarn may be a primary yarn made directly from filaments and/or cut fibers or a secondary yarn made from yarns and/or cords. Secondary yarns are also referred to as cords.

The term "roving" is used to designate an untwisted bundle of strands or yarns. A roving includes a strand of more than two filaments. A non twisted bundle of more than two filaments is accordingly both a strand and a roving.

Filament yarn consists of filament fibers (very long continuous fibers) either twisted together or only grouped together. Thicker monofilaments are typically used for industrial purposes rather than fabric production or decoration.

Tex is a unit of weight expressing the size or coarseness of a natural or synthetic filament or yarn. The tex value of a filament or yarn is the weight in grams per 1 km of the filament or yarn.

1 denier=wt. in g/9000 m=1/9 tex

The unbonded flexible pipe of the invention has a longitudinal axis and comprises from inside and outwards a carcass formed by metal windings with gaps between neighbouring windings, at least one covering tape and an inner sealing sheath of a polymer extruded onto the covering tape. The covering tape is helically wound with a winding direction defining a tape length direction and a tape width direction perpendicular to the tape length direction. The covering tape comprises lengthwise continuous filament yarns (warp yarns) arranged in the tape length direction of the covering tape. The covering tape has a thickness direction perpendicular to the tape length direction and the tape width direction. The warp yarns have a thickness determined in the thickness direction of the covering tape of about 100 μm or less. For improved results it is desired that the warp yarns are even thinner such as of about 50 μm or less, such as from about 3 to about 30 μm, more preferably from about 5 to about 25 μm.

Generally it is desired that the thinner the warp yarns are, the more warp yarns are provided per unit width of the covering tape.

In an embodiment the warp yarns have a coarseness of about 500 tex (g/km) or less, such as of about 300 tex or less, such as from about 25 tex to about 200 tex, preferably from about 50 tex to about 150 tex. The coarseness is a function of the thickness and the material(s) of the warp yarns.

The warp yarns advantageously comprise or consist of twisted bundles of filaments optionally impregnated with a resin. By using even finer filaments for providing the warp yarns, the risk of notch formation in the inner sealing sheath is further reduced.

In an embodiment the warp yarns comprise or consist of untwisted bundles of filaments optionally impregnated with a resin.

Where the warp yarns comprise or consist of bundles of filaments it is highly advantageous that the warp yarns are impregnated with a resin since this has shown to further reduce the risk of notch formation in the inner sealing sheath.

The warp yarns advantageously comprise filaments with a thickness of from about 1 to about 30 μm, preferably from about 5 to about 25 μm.

In an embodiment the warp yarns comprise filaments with a coarseness of about 200 tex or less, such as from about 10 tex to about 180 tex, preferably from about 50 tex to about 150 tex.

In principle any kind of fibers and/or filaments as well as combinations of filaments can be used for forming the warp yarns.

Examples of suitable filaments include carbon filaments, glass filaments, basalt filaments, polymer filaments and combinations thereof.

In an embodiment the warp yarns comprise thermoset polymer filaments, such as epoxy, polyester, vinylester, polyurethane, phenolic and mixtures thereof.

It has been found that where the warp yarns comprise thermoplastic filaments any risk of notch formation in the inner sealing sheath is further reduced.

Therefore in a preferred embodiment the warp yarns comprise thermoplastic polymer, such as aramide filaments, polypropylene filaments, polyethylene filaments, polycarbonate filaments, thermoplastic polyester filaments and mixtures thereof. Advantageously, the thermoplastic polymer has a melting temperature of at least about 150° C., such of at least about 200° C. Thereby the filaments of thermoplastic polymer do not fully melt when the inner sealing sheath is extruded onto the covering tape.

For providing a good strength of the covering tape the warp yarns are advantageously woven with crossing weft yarns. In principle the crossing weft yarns can have any angle relative to the warp yarns. Advantageously the weft yarns are arranged in a relatively straight and parallel formation. For providing a covering tape that can be wound without undesired width deformation, the weft yarns are advantageously arranged with an angle of from about 35 degrees to about 165 degrees to the warp yarns.

In a preferred embodiment the weft yarns are substantially perpendicular to the warp yarns.

The weaving can preferably be provided with as few crossings between warp yarns and weft yarns as possible. Advantageously each weft yarn crosses each weft yarn only once. Thereby the total thickness of the covering tape can be held very low while simultaneously providing a sufficient strength.

Advantageously the weft yarns are continuous weft yarns. It is generally desired that the weft yarns have a thickness similar to or thinner than the warp yarns. In an embodiment the weft yarns have a thickness determined in the thickness direction of the covering tape of 100 μm or less, such as of about 50 μm or less, such as from about 3 to about 30 μm, preferably from about 5 to about 25 μm.

Advantageously the weft yarns comprise filaments with a thickness of from about 1 to about 30 μm, preferably from about 5 to about 25 μm.

In an embodiment the weft yarns comprise filaments with a coarseness of about 500 tex (g/km) or less, such as of about 300 tex or less, such as from about 25 tex to about 200 tex, preferably from about 50 tex to about 150 tex.

The weft yarns can be of any type of material or materials e.g. as the fiber and filament materials mentioned for the warp yarns above.

In an embodiment the weft yarns and the warp yarns are of the same material or material combination.

In an embodiment the weft yarns are of a different material or material combination relative to the warp yarns.

In an embodiment the warp yarns have a coarseness which is at least as high as the coarseness of the weft yarns, preferably the warp yarns have a coarseness which is higher than the coarseness of the weft yarns, such as at least about 10 tex higher than the coarseness of the weft yarns, such as at least about 25 tex higher than the coarseness of the weft yarns, such as at least about 50 tex higher than the coarseness of the weft yarns.

It has been found that the strength of the covering tape in its width direction advantageously should not be too high relative to the strength of the covering tape in its length direction. Thereby the risk of forming notches in the inner sealing sheath along the edges of the covering tape due to tight winding of the covering tape is kept relatively low. This width to length strength ratio can e.g. be provided by selection of the number of warp yarns and weft yarns The number of warp yarns and the number of weft yarns are herein determined per 5 cm² of the covering tape (determined as 5 cm in length direction×5 cm in width direction).

In an embodiment the number of warp yarns is larger than the number of weft yarns. Preferably the number of warp yarns is at least about twice the number of weft yarns. Even more preferably the number of weft yarns is at least about three times the number of warp yarns.

In an embodiment the number of warp yarns is from about 20 to about 100 and the number of weft yarns is from about 5 to about 50. Preferably the number of warp yarns is from about 30 to about 75 and the number of weft yarns is from about 10 to about 30.

It has been found to be highly advantageous to impregnate the warp yarns and/or the weft yarns. By using impregnated warp yarns and/or weft yarns the arrangement of the warp yarns and the weft yarns can be held very stable and any risk of yarns sticking out of the structure of the covering tape is kept very low while the crossing of weft yarns and warp yarns simultaneously can be kept at a minimum.

When using a thermoplastic resin this impregnation can in a simple manner cause the weft yarns and the warp yarns to stick together in their weaving structure by simply heating the covering tape after weaving.

Advantageously the warp yarns and/or the weft yarns are therefore impregnated with a thermoplastic resin, such as a thermoplastic resin comprising polyamide (PA), polybutylene terephthalate (PBT), thermoplastic polyester (PET), polycarbonate (PC), polyethylene (PE), polypropylene (PP), polyvinyl chloride (PVC) and mixtures comprising one or more of these thermoplastic resins.

In a preferred embodiment the thermoplastic resin impregnating the warp yarns and/or the weft yarns has a melting point which is lower than a melting point of the warp yarns and the weft yarns. More preferably the thermoplastic resin impregnating the warp yarns and/or the weft yarns has a melting point which is lower than any melting point of any of the warp yarns and the weft yarns. Advantageously the covering tape has been subjected to a thermal treatment comprising softening the thermoplastic resin without melting any weft yarns or warp yarns. The softening of the thermoplastic resin is advantageously sufficient to cause the weft yarns and the warp yarns to stick together where they cross in their weaving structure.

In an embodiment the thermoplastic resin impregnating the warp yarns and/or the weft yarns has a melting point of about 200° C. or less such as of about 180° C. or less.

In an embodiment the warp yarns and/or the weft yarns are impregnated with a thermoplastic resin by being fully coated with the thermoplastic resin. This is the simplest way of providing that the weft yarns and the warp yarns can stick together where they are crossing in their weaving structure.

The weft yarns and the warp yarns are advantageously coated with thermoplastic resin prior to weaving of the covering tape.

Advantageously the warp yarns and the weft yarns are of identical material(s), preferably the warp yarns and the weft yarns are substantially identical.

In an embodiment the warp yarns and the weft yarns are of polyester and/or basalt and the warp yarns and/or the weft yarns are impregnated with polyvinyl chloride.

In an embodiment the covering tape has a longitudinal tensile strength in its length direction and a width tensile strength in its width direction, wherein its longitudinal tensile strength is higher than the width tensile strength. Thereby the risk of forming notches in the inner sealing sheath along the edges of the covering tape due to tight winding of the covering tape is kept very low.

Preferably the longitudinal tensile strength is at least about 10% higher than its width tensile strength, such as at least about 50% higher, such as at least about 100% higher, such as from about 200% to about 800% higher than its width tensile strength.

In an embodiment the longitudinal tensile strength is at least about 500 N/5 cm, such as at least about 1000 N/5 cm, preferably the longitudinal tensile strength is from about 1500 to about 5000 N/5 cm.

In an embodiment the width tensile strength is up to about 2500 N/5 cm, such as up to about 2000 N/5 cm, such as is from about 50 to about 1500 N/5 cm.

In an embodiment the covering tape is impregnated with a resin, such as a thermoplastic resin after it has been woven.

Advantageously the covering tape has a thickness of 0.5 mm or less. More preferably the covering tape is even thinner e.g. about 0.2 mm or less, preferably of up to about 0.1 mm.

The covering tape can have any width. For simple handling in the winding process the width of the covering tape should advantageously not exceed about 200 cm. Also it is desired that the width of the covering tape is not too small and preferably not less than about 3 cm. Advantageously the covering tape has a width of from about 5 cm to about 150 cm, such as from about 10 cm to about 100 cm, such as from about 20 cm to about 75.

The covering tape can in principle be wound upon the carcass with any winding degree. However, it has been found that a very low winding degree may complicate the winding process and result in undesired folds of the covering tape which again can negatively affect formation of notches in the inner sealing sheath extruded onto the covering tape.

Advantageously the covering tape is helically wound with an angle to the longitudinal axis of the pipe of about 40 degree or more, such as of about 45 degree or more, such as of about 50 degree or more.

For optimal results it is desired to apply the covering tape such that the carcass is covered with a plurality of layers of the covering tape.

Therefore, in an embodiment the pipe comprises a plurality of covering tape wound upon each other between the carcass and the inner sealing sheath, such as preferably 3, 4 or 5 covering tapes.

The covering tape or tapes are advantageously wound with an overlap such as from about 5 width % to about 90 width % in overlap. Preferably the winding overlap is from about 20 width % to about 60 width %, more preferably from about 30 width % to about 50 width %.

The carcass can in principle be any kind of carcass normally used in unbonded flexible pipe e.g. as described in "Recommended Practice for Flexible Pipe", ANSI/API 17 B, fourth Edition, July 2008, and the standard "Specification for Unbonded Flexible Pipe", ANSI/API 17J, Third edition, July 2008.

Advantageously the carcass is made from helically wound, folded and interlocked strips of steel.

In an embodiment the carcass is made from helically wound, profiled steel wires optionally interlocked with folded strips of steel.

The inner sealing sheath is for example as the inner sealing sheath described in "Recommended Practice for Flexible Pipe", ANSI/API 17 B, fourth Edition, July 2008, and the standard "Specification for Unbonded Flexible Pipe", ANSI/API 17J, Third edition, July 2008.

In an embodiment inner sealing sheath is in the form of an extruded layer comprising or consisting of from polyvinylidene fluoride (PVDF) (copolymer or monopolymer), polyethylene (PS) (optionally crosslinked) and/or polyamide (PA 6, PA 11 or PA 12).

The present invention is in particular advantageous where the inner sealing sheath comprises or consists of a flour containing polymer since such materials usually are relative notch sensitive.

In an embodiment the inner sealing sheath is in the form of an extruded layer comprising or consisting of a flour containing polymer such as fluorinated alkoxyethylene (PFA), polytetrafluoroethylene (PTFE), polyvinylidene fluoride (PVDF) or mixtures thereof.

The flexible pipe may comprise one or more additional layers such as layers of flexible pipes known from prior art and/or described in "Recommended Practice for Flexible Pipe", ANSI/API 17 B, fourth Edition, July 2008, and the standard "Specification for Unbonded Flexible Pipe", ANSI/API 17J, Third edition, July 2008.

The flexible pipe of the invention may accordingly be combined with any additional layers selected from the layers of flexible pipes described in any one of the prior art documents GB 1 404 394, U.S. Pat. No. 3,311,133, U.S. Pat. No. 3,687,169, U.S. Pat. No. 3,858,616, U.S. Pat. No. 4,549,581, U.S. Pat. No. 4,706,713, U.S. Pat. No. 5,213,637, U.S. Pat. No. 5,407,744, U.S. Pat. No. 5,601,893, U.S. Pat. No. 5,645,109, U.S. Pat. No. 5,669,420, U.S. Pat. No. 5,730,188, U.S. Pat. No. 5,730,188, U.S. Pat. No. 5,813,439, U.S. Pat. No. 5,837,083, U.S. Pat. No. 5,922,149, U.S. Pat. No. 6,016,847, U.S. Pat. No. 6,065,501, U.S. Pat. No. 6,145,546, U.S. Pat. No. 6,192,941, U.S. Pat. No. 6,253,793, U.S. Pat. No. 6,283,161, U.S. Pat. No. 6,291,079, U.S. Pat. No. 6,354,333, U.S. Pat. No. 6,382,681, U.S. Pat. No. 6,390,141, U.S. Pat. No. 6,408,891, U.S. Pat. No. 6,415,825, U.S. Pat. No. 6,454,897, U.S. Pat. No. 6,516,833, U.S. Pat. No. 6,668,867, U.S. Pat. No. 6,691,743, U.S. Pat. No. 6,739,355 U.S. Pat. No. 6,840,286, U.S. Pat. No. 6,889,717, U.S. Pat. No. 6,889,718, U.S. Pat. No. 6,904,939, U.S. Pat. No. 6,978,806, U.S. Pat. No. 6,981,526, U.S. Pat. No. 7,032,623, U.S. Pat. No. 7,311,123, U.S. Pat. No. 7,487,803, U.S. 23102044, WO 28025893, WO 2009024156, WO 2008077410 and WO 2008077409, WO 2011079845, WO 2011072690.

In one embodiment the flexible pipe is an unbonded pipe, the flexible pipe preferably comprises two or more outer armoring layers, preferably comprising at least one pressure armoring layer and at least one tensile armoring layer, preferably anti-wear layer or layers are applied between the outer armoring layers. Such layers are described in the above mentioned prior art publications.

Such outer armoring layer or layers may for example comprise one or more of the materials selected from metals or fiber reinforced polymers or both metal and fiber reinforced polymer, e.g. any of the materials described above.

Such outer armoring layer or layers may preferably be in the form of helically wound profiles and/or folded strips as described in the above prior art publications.

In one embodiment such outer armoring layer or layers is/are in the form of helically wound profiles and/or folded strips.

In one embodiment the flexible pipe comprises an outer sheath. The outer sheath may preferably be liquid impervious. The outer sheath may for example be a polymer sheath. Such outer sheath is described in the above mentioned prior art publications.

In one embodiment the flexible pipe comprises one or more additional polymer layers and/or metal layers such as one or more thermal insulation layers, and one or more film and/or foil layers. Such layers are described in the above mentioned prior art publications.

In one embodiment the flexible pipe of the invention comprises a sensor for example as described in any one of U.S. Pat. No. 7,024,941, WO 2008077410, WO 2012062328, WO 2009106078 and WO 2011042023.

All features of the invention including ranges and preferred ranges can be combined in various ways within the scope of the invention, unless there are specific reasons not to combine such features.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS AND EXAMPLES

The invention will be explained more fully below in connection with a preferred embodiment and with reference to the drawings in which.

The figures are schematic and simplified for clarity and they show only details which are essential to the understanding of the invention, while other details are left out. Throughout the same reference numerals are used for identical or corresponding parts.

Figure 1:
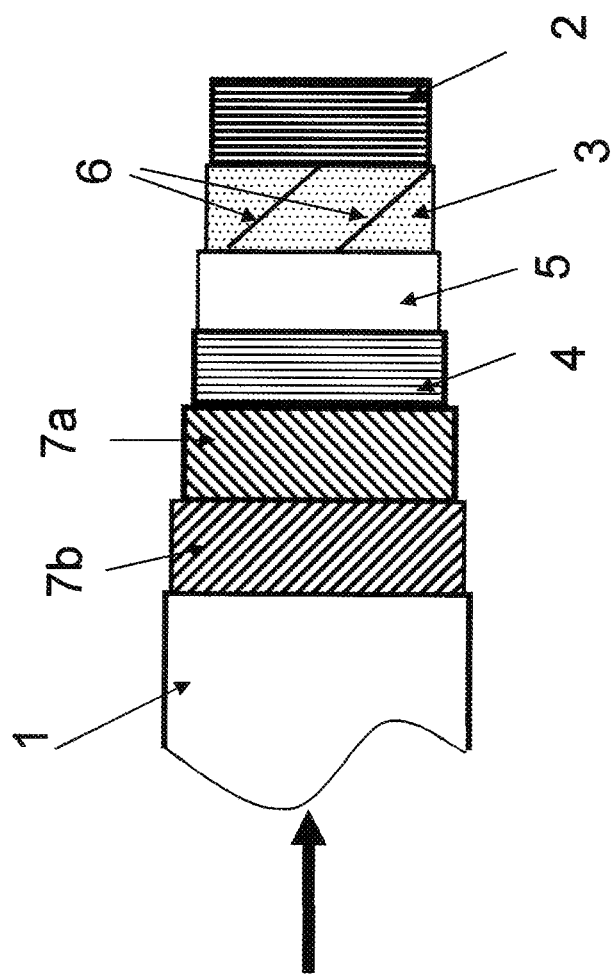
FIG. 1 is a schematic side view of an unbonded flexible pipe of the invention.

The flexible pipe shown in FIG. 1 comprises from inside and out a carcass 2, a helically wound covering tape 3, an inner sealing sheath 5, a pressure armor layer 4, two cross wound tensile armor layers 7a, 7b and an outer sheath 1.

Whereas the unbonded flexible pipe of the invention must have the carcass 2, the helically wound covering tape 3 and the inner sealing sheath 5, the layers on the outer side of the inner sealing sheath 5 are not necessarily required and one or more of these layers may be omitted. In the same way the unbonded flexible pipe may have further layers as described above.

The inner sealing sheath 5 is advantageously of poly ethylene (HDPE), cross linked polyethylene (PEX), Polyvinyldifluorid (PVDF) or polyamide (PA) and has the purpose of preventing outflow of the fluid transferred in the bore of the pipe, indicated with the arrow. The carcass 2 is normally of metal and has the main purpose of reinforcing the pipe against collapse. The carcass 6 is not liquid tight. The helically wound covering tape 3 is as described above. As shown the helically wound covering tape 3 is helically wound with a relatively low winding angle to the longitudinal axis of the unbonded flexible pipe as indicated with the reference number 6.

The pressure armor layer 4 is often of helically wound armor element(s) of metal or composite material or combinations, which is wound with an angle to the axis of the pipe of about 65 degrees or more e. g. about 85 degrees. The pressure armor layer 4 is not liquid tight.

The cross wound tensile armor layers 7a, 7b are wound from elongate armor elements. The two armor layers with opposite winding directions are normally referred to as being cross wound. The outer sheath 1 can be a liquid tight outer sealing sheath protecting the armor layer mechanically and protect against ingress of sea water or it can be a liquid pervious outer sheath merely providing mechanical protection. Where the outer sheath 1 is liquid pervious it is often desired that the unbonded flexible pipe comprises an intermediate sealing sheath covering the pressure armor layer 4, in particular where the pressure armor layer 4 is of or comprises metal. The unbonded flexible pipe advantageously comprises anti-friction layers between the armor layers 4, 7a, 7b. The anti-friction layers are usually not liquid tight and may for example be in the form of a wound tape.

Figure 2:
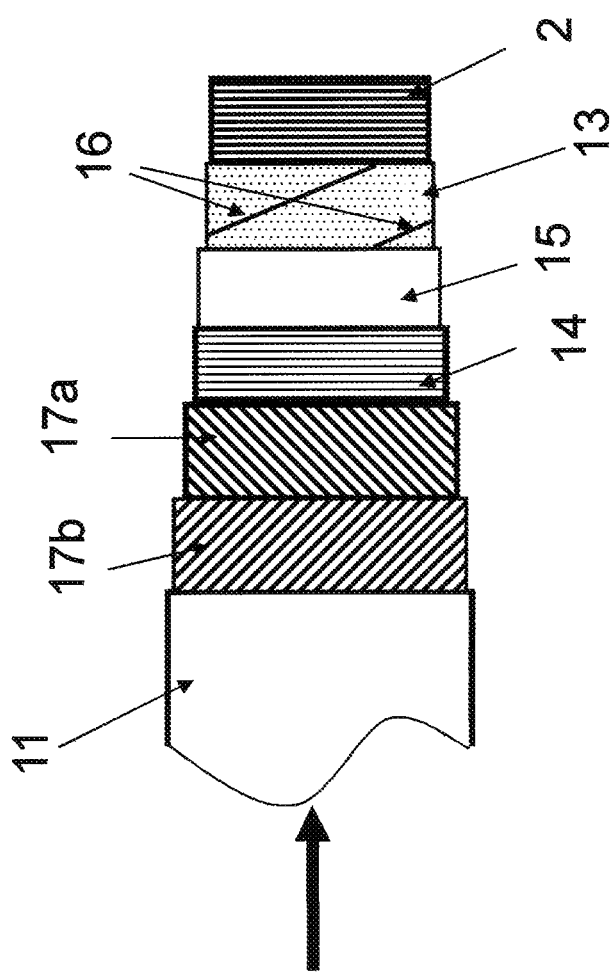
FIG. 2 is a schematic side view of another unbonded flexible pipe of the invention.

FIG. 2 shows a variation of the flexible armored pipe shown in FIG. 1 comprising from inside and out a carcass 12, a helically wound covering tape 13, an inner sealing sheath 15, a pressure armor layer 14, two cross wound tensile armor layers 17a, 17b and an outer sheath 11. The helically wound covering tape 13 is helically wound with a relatively high winding angle to the longitudinal axis of the unbonded flexible pipe as indicated with the reference number 16.

EXAMPLE

Example 1

An unbonded flexible pipe with an inner diameter of about 20 cm and comprising a plurality of layers is prepared. The layers of the unbonded flexible pipe are as shown in table 1 in the listed order from inside and out of the unbonded flexible pipe.

TABLE 1

| A carcass | The carcass is made from strips of a steel. The strips are folded and interlocked as shown in "Recommended Practice for Flexible Pipe", ANSI/API 17 B, fourth Edition, July 2008, FIG. 7, e). The Steel is stainless steel is Nicrofer ® marketed by ThyssenKrupp VDM Gmbh |
|---|---|
| A covering layer | The covering layer is provided by 3 layers of helically wound covering tapes (winding degree is 55; overlap is 15 cm), with a width of 40 cm and a thickness of 0.1 mm. The covering tapes comprise warp yarns and perpendicular weft yarns of basalt filaments impregnated with polyethylene. |
| An inner sealing sheath | The inner sealing sheath is an extruded polyvinylidene difluoride, Solef ® PVDF with a thickness of about 6 mm. |
| A pressure armor layer | The pressure armor is provided by helically wound and interlocked, elongate C shaped profiles of |

TABLE 1-continued

| | carbon steel. |
|---|---|
| An anti-friction layer | The anti-friction layer is provided by thin, helically wound polymer tapes. |
| A first tensile armor layer | The first tensile armor layer is provided by helically wound wires of carbon steel. |
| An anti-friction layer | The anti-friction layer is provided by thin, helically wound polymer tapes. |
| A second tensile armor layer | The second tensile armor layer is provided by helically wound wires of carbon steel. |
| A holding tape | The anti-friction layer (anti-bird-cage layer) is of helically wound aramide fibers with a high winding degree >80 to the longitudinal axis. |
| An outer sheath | The outer sheath is a liquid impermeable extruded layer of polyamide PA11 with a thickness of about 6 mm. |

Example 2

As example 1, but where the covering layer is provided by 4 layers of helically wound covering tapes (winding degree is 40; overlap is 25 cm), with a width of 50 cm and a thickness of 0.09 mm. The covering tapes comprise warp yarns and weft yarns of thermoset polyester filaments impregnated with thermoplastic polyester. The weft yarns have an angle of 75 degrees to the warp yarns.

Example 3

As example 1, but where the covering layer is provided by 4 layers of helically wound covering tapes (winding degree is 50; overlap is 20 cm), with a width of 50 cm and a thickness of 0.08 mm. The covering tapes comprise warp yarns of carbon filaments impregnated with polypropylene and weft yarns of aramide filaments impregnated polypropylene. The weft yarns have an angle of 45 degrees to the warp yarns.

Some preferred embodiments have been shown in the foregoing, but it should be stressed that the invention is not limited to these, but may be embodied in other ways within the subject-matter defined in the following claims.

What is claimed is:

1. An unbonded flexible pipe having a longitudinal axis and comprising from inside outwards a carcass formed by metal windings with gaps between neighbouring windings, at least one covering tape and an inner sealing sheath of a polymer extruded onto the covering tape, wherein the covering tape is helically wound with a winding direction defining a tape length direction and a tape width direction perpendicular to the tape length direction, the covering tape comprises lengthwise continuous filament yarns (warp yarns) arranged in the tape length direction of the covering tape, said covering tape has a thickness direction perpendicular to the tape length direction and the tape width direction, said warp yarns have a thickness determined in the thickness direction of the covering tape of about 100 µm or less.

2. The unbonded flexible pipe of claim 1, wherein the warp yarns have a coarseness of about 500 tex (g/km) or less.

3. The unbonded flexible pipe of claim 1, wherein the warp yarns comprise twisted bundles of filaments.

4. The unbonded flexible pipe of claim 1, wherein the warp yarns comprises untwisted bundles of filaments.

5. The unbonded flexible pipe of claim 1, wherein the warp yarns comprise filaments with a thickness of from about 1 to about 30 µm.

6. The unbonded flexible pipe of claim 1, wherein the warp yarns comprise filaments with a coarseness of about 200 tex or less.

7. The unbonded flexible pipe of claim 1, wherein the warp yarns are woven with crossing weft yarns, suitable arranged with an angle of from about 35 degrees to about 165 degrees to the warp yarns.

8. The unbonded flexible pipe of claim 1, wherein the warp yarns are woven with crossing weft yarns, the weft yarns are continuous weft yarns, having a thickness determined in the thickness direction of the covering tape of 100 µm or less.

9. The unbonded flexible pipe of claim 1, wherein the warp yarns are woven with crossing weft yarns, the weft yarns comprise filaments with a thickness of from about 1 to about 30 µm.

10. The unbonded flexible pipe of claim 1, wherein the warp yarns are woven with crossing weft yarns, the weft yarns comprise filaments with a coarseness of about 500 tex (g/km) or less.

11. The unbonded flexible pipe of claim 1, wherein the warp yarns are woven with crossing weft yarns, the warp yarns have a coarseness which is at least as high as the coarseness of the weft yarns.

12. The unbonded flexible pipe of claim 1, wherein the warp yarns are woven with crossing weft yarns, the warp yarns have a coarseness which is higher than the coarseness of the weft yarns, and at least about 10 tex higher than the coarseness of the weft yarns.

13. The unbonded flexible pipe of claim 1, wherein the covering tape comprises per 5 cm² (determined as 5 cm in length direction×5 cm in width direction) a number of warp yarns and a number of weft yarns, wherein the number of warp yarns is larger than the number of weft yarns.

14. The unbonded flexible pipe of claim 1, wherein the covering tape comprises per 5 cm² (determined as 5 cm in length direction×5 cm in width direction) a number of warp yarns and a number of weft yarns, wherein the number of warp yarns is from about 20 to about 100 and the number of weft yarns is from about 5 to about 50.

15. The unbonded flexible pipe of claim 1, wherein the warp yarns are woven with crossing weft yarns, the warp yarns and/or the weft yarns are impregnated with a thermoplastic resin, the thermoplastic resin impregnating the warp yarns and/or the weft yarns has a melting point of about 200° C. or less.

16. The unbonded flexible pipe of claim 1, wherein the covering tape has a longitudinal tensile strength in its length direction and a width tensile strength in its width direction, wherein its longitudinal tensile strength is higher than the width tensile strength.

17. The unbonded flexible pipe of claim 1, wherein the covering tape has a longitudinal tensile strength in its length direction and a width tensile strength in its width direction, the longitudinal tensile strength is at least about 500 N/5 cm.

18. The unbonded flexible pipe of claim 1, wherein the covering tape has a longitudinal tensile strength in its length direction and a width tensile strength in its width direction, the width tensile strength is up to about 2500 N/5 cm.

19. The unbonded flexible pipe of claim 1, wherein the covering tape is helically wound with an angle to the longitudinal axis of the pipe of about 40 degree or more.

20. The unbonded flexible pipe of claim 1, wherein the pipe comprises a plurality of covering tapes wound upon each other between the carcass and the inner sealing sheath, comprising at least 3 covering tapes.

21. The unbonded flexible pipe of claim 3, wherein the twisted bundles of filaments are impregnated with a resin.

22. The unbonded flexible pipe of claim 4, wherein the untwisted bundles of filaments are impregnated with a resin.

* * * * *